(12) United States Patent
Nallampatti Ekambaram et al.

(10) Patent No.: US 9,801,019 B2
(45) Date of Patent: Oct. 24, 2017

(54) ADAPTIVE TRIGGERING OF RTT RANGING FOR ENHANCED POSITION ACCURACY

(71) Applicant: QUALCOMM Incorporated, San Diego, CA (US)

(72) Inventors: Venkatesan Nallampatti Ekambaram, Somerville, NJ (US); Urs Niesen, Summit, NJ (US); Jubin Jose, Belle Mead, NJ (US); Xinzhou Wu, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 14/795,642

(22) Filed: Jul. 9, 2015

(65) Prior Publication Data
US 2016/0277890 A1    Sep. 22, 2016

Related U.S. Application Data

(60) Provisional application No. 62/133,822, filed on Mar. 16, 2015.

(51) Int. Cl.
*H04W 4/02*    (2009.01)
*G01S 13/74*   (2006.01)
(Continued)

(52) U.S. Cl.
CPC .............. *H04W 4/023* (2013.01); *G01S 7/40* (2013.01); *G01S 13/74* (2013.01); *H04W 4/046* (2013.01);
(Continued)

(58) Field of Classification Search
CPC .................................................... H04W 4/023
See application file for complete search history.

(56) References Cited

U.S. PATENT DOCUMENTS 6,486,831 B1    11/2002    Martorana et al.
6,801,782 B2    10/2004    McCrady et al.
(Continued)

OTHER PUBLICATIONS

"A cooperative positioning algorithm for DSRC enabled vehicular network" by Efatmaneshnik et al., Archives of Photogrammetry, Cartography and Remote Sensing, vol. 22, 2011, pp. 117-129, available from http://yadda.icm.edu.pl/baztech/element/bwmeta1.element.baztech-420d16eb-dfe5-4651-8e10-cbf734bb09f2/c/Efatmaneshnik.pdf.*

(Continued)

*Primary Examiner* — Vladimir Magloire
*Assistant Examiner* — David Orange
(74) *Attorney, Agent, or Firm* — Arent Fox LLP

(57) ABSTRACT

A range between a first wireless device and a second wireless device is estimated using a first mechanism based on messages transmitted over a first communication channel. The first communication channel is associated with a first radio access technology capability of the wireless devices. One or more metrics indicative of an accuracy of the range estimates provided by the first mechanism are obtained. A second mechanism to estimate a range between the first wireless device and the second wireless device may be implemented in favor of the first mechanism when the metric fails to satisfy a criterion. The second mechanism is based on unicast messages transmitted over a second communication channel. The second communication channel is associated with a second radio access technology capability of the wireless devices and may be the same as, or different from, the first communication channel.

30 Claims, 8 Drawing Sheets

(51) Int. Cl.
*G01S 7/40* (2006.01)
*H04W 64/00* (2009.01)
*H04W 28/02* (2009.01)
*H04W 24/08* (2009.01)
*H04W 4/04* (2009.01)

(52) U.S. Cl.
CPC ....... *H04W 24/08* (2013.01); *H04W 28/0284* (2013.01); *H04W 64/00* (2013.01)

(56) References Cited

U.S. PATENT DOCUMENTS

| | | | |
|---|---|---|---|
| 8,594,018 B2 | 11/2013 | Richards et al. | |
| 2008/0291086 A1* | 11/2008 | Walley | G01S 5/0263 342/367 |
| 2014/0187259 A1 | 7/2014 | Kakani et al. | |
| 2014/0253388 A1* | 9/2014 | Jalali | G01S 5/06 342/458 |
| 2014/0269400 A1 | 9/2014 | Aldana et al. | |
| 2014/0357292 A1 | 12/2014 | Walma et al. | |

OTHER PUBLICATIONS

International Search Report and Written Opinion—PCT/US2016/017595—ISA/EPO—dated May 12, 2016.
Simic M.N., "Vehicular Ad Hoc Networks", 2013 11th International Conference on Telecommunications in Modem Satellite, Cable and Broadcasting Services (TELSIKS), IEEE, vol. 2, Oct. 16, 2013 (Oct. 16, 2013), pp. 613-618, XP032539934, DOI: 10.1109/TELSKS.2013.6704453 ISBN: 978-1-4799-0899-8 [retrieved on Jan. 6, 2014].
Hamid N.I.B., et al., "Optimizing the Handover Procedure in IEEE 802.16e Mobile Wimax Network," National Conference on Communication and Information Security (NCCIS), Feb. 2009, pp. 24-29.

* cited by examiner

ADAPTIVE TRIGGERING OF RTT RANGING FOR ENHANCED POSITION ACCURACY

CROSS-REFERENCE TO RELATED APPLICATION(S)

This application claims the benefit of U.S. Provisional Application Ser. No. 62/133,822, entitled "ADAPTIVE TRIGGERING OF UNICAST RTT RANGING FOR ENHANCED POSITION ACCURACY" and filed on Mar. 16, 2015, which is expressly incorporated by reference herein in its entirety.

BACKGROUND

Field

The present disclosure relates generally to wireless devices, and more particularly, to range estimations between wireless devices that involve adaptive triggering of round trip time (RTT) ranging.

Background

Time of flight measurements may be used to estimate the distance between a transmitter and a receiver. In this approach, the transmitter may measure the time of departure of a first packet, and the receiver may measure the time of arrival of the first packet. The transmitter may then send the time of departure to the receiver in a second packet. The receiver may then compute the time of flight of the first packet by taking the difference between the time of arrival (measured locally from the first packet by the receiver) and the time of departure (obtained from the transmitter with the second packet). This is the known as the Fine Timing Measurement—Acknowledgement (FTM-ACK) or the RTT unicast mechanism. In this scheme, the clocks on the transmitter and the receiver may be assumed to be not synchronized.

RTT ranging may be accurate and may be possible to achieve centimeter-level accuracy. However, the scalability of the prior RTT ranging schemes may be questionable in cases of multiple devices. As an example, in the vehicular dedicated short-range communication (DSRC) standard, the number of message exchanges scales as the square of the number of devices, and in cases where there are around 100 vehicles in the radio range, the number of message exchanges required would be high and imposes significant burden on the computing elements of the vehicles.

In addition, coarse ranging estimates may be obtained using broadcast messaging on a channel. For example, DSRC message timing information may provide a certain granularity of positioning accuracy. Similarly, range estimates may be obtained on Long-Term Evolution Direct or LTE-D spectrum, since the clocks of the transmitter and receiver may be synchronized to a certain level of accuracy. However, in cases where messages are lost or the estimation accuracy drops, such coarse ranging estimates may not suffice.

SUMMARY

In an aspect of the disclosure, a method, a computer program product, and an apparatus are provided. A range between a first wireless device and a second wireless device is estimated using a first mechanism based on messages transmitted over a first communication channel. The first communication channel is associated with a first radio access technology capability of the wireless devices and may be, for example, one of a DSRC, a LTE, and a WiFi channel. One or more metrics indicative of an accuracy of the range estimation provided by the first mechanism are obtained. A second mechanism to estimate a range between the first wireless device and the second wireless device may be implemented in favor of the first mechanism when the metric fails to satisfy a criterion. The second mechanism is based on unicast messages transmitted over a second communication channel. The second communication channel is associated with a second radio access technology capability of the wireless devices and may be the same as, or different from, the first communication channel.

DETAILED DESCRIPTION

Figure 1:
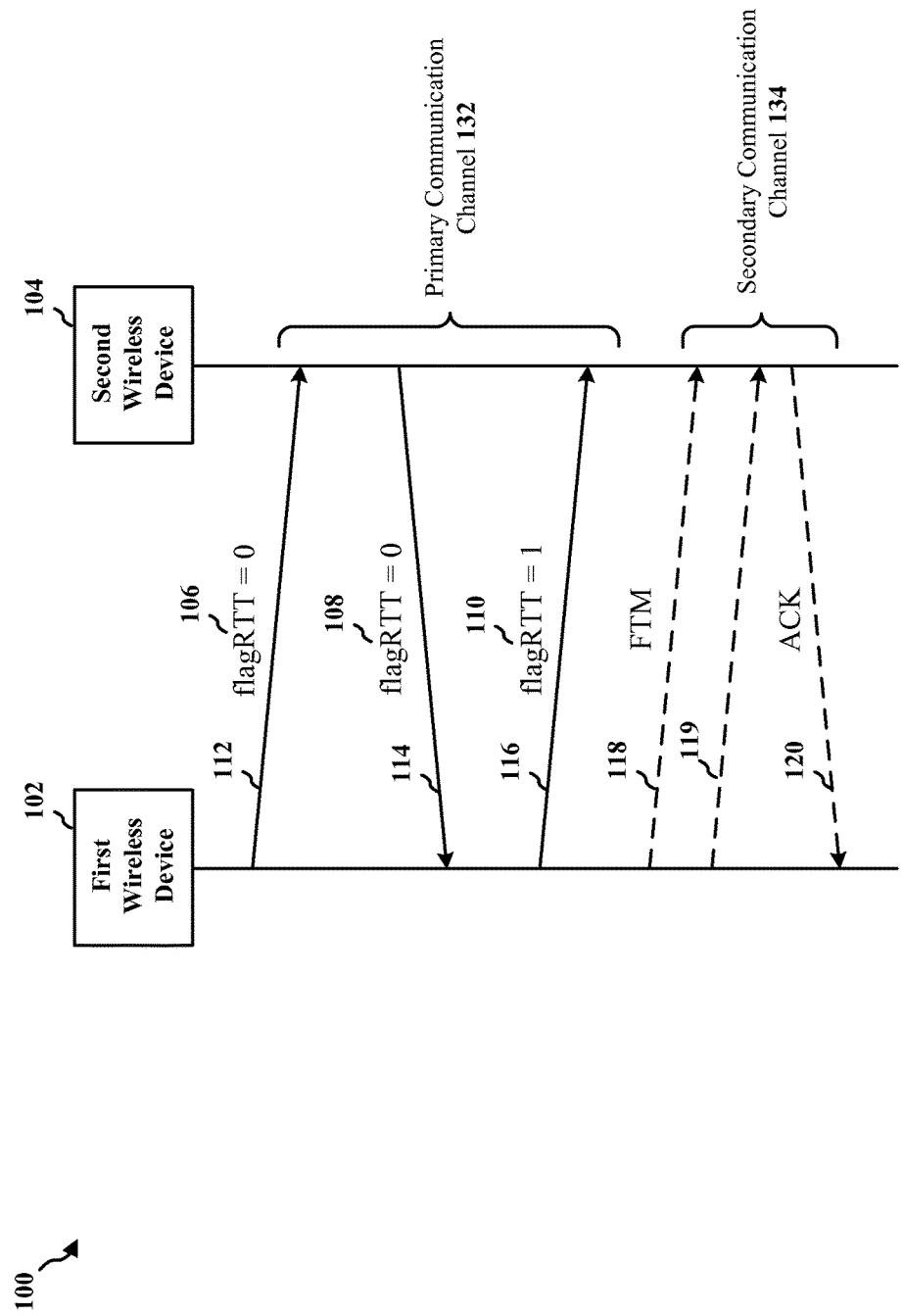
FIG. 1 is an illustration of message exchanges between two wireless devices that implements a switch from a first mechanism of estimating the distance or range between the two devices to a second mechanism.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

Disclosed herein is an exemplary method for dynamically switching from a first mechanism for estimating a range or distance between two wireless devices, to a second mechanism having enhanced accuracy. Metrics indicative of range accuracy are obtained during range estimating using the first mechanism. A switch from the first mechanism to the second mechanism is triggered based on one or more of the metrics. In one implementation, the first mechanism may be based on broadcast messages transmitted over a first communication channel, and the second mechanism may be based on unicast messages transmitted over a second communication channel. The first communication channel and the second communication channel may be the same, and may be for example, any one of a DSRC, a LTE-D, or a WiFi channel.

FIG. 1 is an illustration 100 of message exchanges between two wireless devices 102, 104, including a switch from a first mechanism of estimating the distance or range between the two devices over a first communication channel to a second mechanism of range estimation over a second communication channel. The first mechanism of estimating the distance may be based on broadcast messages. An example broadcast mechanism is described in further detail below with reference to FIGS. 5-8.

With continued reference to FIG. 1, trigger control signals 106, 108, 110 may be included in broadcast messages 112, 114, 116 exchanged between the first wireless device 102 and the second wireless device 104 as part of the first range-estimation mechanism. The control signals 106, 108, 110 may be included as a flag in a header of the broadcast messages 112, 114, 116. For example, the control signals 106, 108 having a flagRTT=0 may indicate that the range estimation using the first mechanism may continue, while a control signal 110 having a flagRTT=1 may indicate that the range estimation should switch to the second mechanism. In this example, the first mechanism may be a broadcast mechanism and the second mechanism may be an RTT ranging mechanism. When a switch to the second mechanism occurs, subsequent control signals may indicate a switch back to the first mechanism. For example, a control signal having a flagRTT=1 may indicate that the range estimation using the second mechanism may continue, while a control signal having a flagRTT=0 may indicate that the range estimation may switch back to the first mechanism.

One or more of the following metrics may be monitored during range estimation using the first mechanism:

Estimated ranging error e(t)—this metric provides a measure of the accuracy of the range estimates obtained using the current ranging mechanism. This may be obtained as part of the ranging algorithm and other sensory inputs such as the inertial navigation system.

Number of packet losses in a window $p_L(t)$—this metric provides a measure of the channel quality between the wireless devices 102, 104. This can be estimated by the first wireless device 102 based on the response of the remaining wireless devices (e.g., the wireless device 104). For example, the first wireless device 102 may estimate $p_L(t)$ by monitoring the ACK in case of unicast ranging or by monitoring any relevant timestamps addressed to the first wireless device 102 in the packets transmitted by the other devices (e.g., the wireless device 104).

Network congestion level c(t)—this metric provides a measure of the channel occupancy due to transmissions from all other devices (e.g., the wireless device 104). This can be obtained by periodically sensing a channel for any packet transmissions.

Safety threshold (e.g. in vehicular ranging) s(t)—this metric provides a measure of the required ranging accuracy for a given scenario. For example, when a vehicle is very close to another vehicle, the ranging estimate needs to be accurate, particularly in dense traffic scenarios. This metric can be a combination of different inputs such as the relative locations of the vehicles, weather conditions, etc.

A function of one or more of the above metrics may be evaluated against a criterion. If the criterion is not satisfied, then a switch to range estimation using a second mechanism over a second communication channel (e.g., secondary communication channel 134) may be triggered. After switching to the second mechanism, the metrics continue to be evaluated against the criterion. If the criterion is satisfied, then a switch back to range estimation using a first mechanism over a first communication channel (e.g., primary communication channel 132) may be triggered. The criterion function could be a simple threshold function. For example, in response to one or more of the above metrics crossing a threshold, a decision to switch range estimation mechanisms may be made.

As a result of a decision to enable a second ranging mechanism, e.g., RTT ranging, over a second communication channel (e.g., secondary communication channel 134), a subset of wireless devices with which RTT ranging is desired may be specified. In some implementations, the subset is less than all of the wireless devices. For example, information regarding the identification of the devices to which RTT ranging is desired may be sent as part of a control packet included in a message broadcast over the first communication channel (e.g., primary communication channel 132). Information identifying the second communication channel may also be included in the control packet. The control packet may be included in the same broadcast message 116 that includes the trigger control signal 110.

On the receiving side of these broadcast messages, a wireless device (e.g., second wireless device 104) with which RTT ranging is requested recognizes its identification in the message and responds by activating for communications over the secondary communication channel (e.g., secondary communication channel 134) identified in the packet. Such activation may involve turning on a secondary radio (e.g. Wi-Fi) and/or performing RTT ranging over the secondary communication channel 134 through an exchange of FTM packet 118 and ACK packet 120. Such RTT ranging is well known in the art and involves, in summary, the first wireless device 102 measuring the time of departure of the FTM packet 118 and the second wireless device 104 sending an acknowledgement or ACK packet 120 and measuring the time of arrival of the FTM packet 118. The first wireless device 102 then sends the time of departure to the second wireless device 104 in a second packet 119. The second wireless device 104 then computes the desired time of flight of the FTM packet 118 by taking the difference between the time of arrival (measured locally from the FTM packet 118) and the time of departure (obtained from the first wireless device 102 with the second packet 119).

Regarding the second communication channel (e.g., secondary communication channel 134), as previously describes, it may be the same as the first communication channel or different from the first communication channel (e.g., primary communication channel 132). The secondary communication channel may be selected based on the same metrics used to determine whether to switch to the second range-estimation mechanism. For example, if a metric indicates that the network supporting the first communication channel used to implement the first range-estimation mechanism is overloaded or congested, a second communication channel that does not rely on the same communications network may be selected. For example, if the first communication channel is a LTE channel, then the second communication channel selected for implementing the second range-estimation mechanism may be a Wi-Fi channel.

Moreover, the enhanced range estimates obtained from the second mechanism, e.g., RTT ranging, may be incorporated in the ranging estimates over the primary mechanism to boost the accuracy. The second ranging mechanism may be assumed to be more accurate since it directly accounts for various uncertainties such as clock drifts and offsets. For example, RTT ranging can provide decimeter level accuracy due to the two-way packet exchange. This accuracy improvement comes with the overhead of unicast transmissions between vehicles. Once the second ranging mechanism is activated, the range estimates may be substituted for the range estimates that are obtained from the primary mechanism and may be associated with a lower error variance. The primary mechanism can then take over with the new range estimates with a lower error variance.

Figure 2:
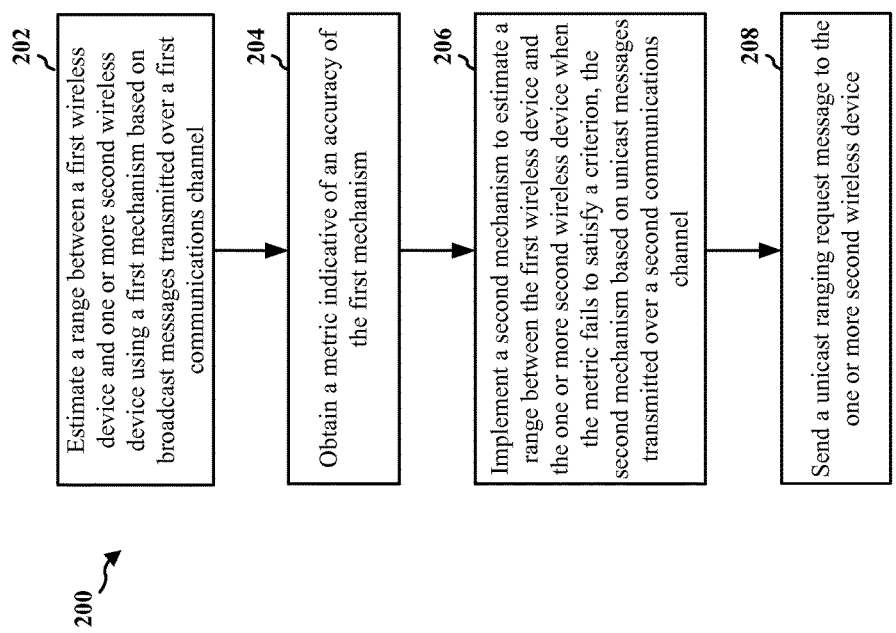
FIG. 2 is a flow chart of a method of estimating a range between a first wireless device and a second wireless device.

FIG. 2 is a flow chart 200 of a method of range estimation by a first wireless device 102 relative to one or more second wireless devices 104. The method may be performed by the first wireless device 102. At 202, a range between the first wireless device 102 and the one or more second wireless devices 104 is estimated using a first mechanism based on messages 112, 114, 116 transmitted over a first communication channel. The messages may be broadcast messages. The first communication channel may be associated with a first radio access technology (RAT) that supports communication over the first channel. The first communication channel may be one of a DSRC channel, a LTE channel, and a WiFi channel. The first mechanism for estimating the range between the first wireless device 102 and the one or more second wireless devices 104 may correspond to the mechanism described below with reference to FIGS. 5-8.

At 204, a metric indicative of an accuracy of the first range-estimation mechanism is obtained. The metric may be an estimate of a ranging accuracy. In this case, the criterion may be a minimum level of accuracy, and the criterion is not satisfied when the ranging accuracy is below the minimum level. In one example, the metric may be packet loss probability. In this case, the criterion may be an acceptable probability value, and the criterion is not satisfied when the packet loss probability is greater than the acceptable probability value.

In one example, the metric may be a level of congestion in the communications network supporting the first communication channel. In this case, the criterion may be an acceptable congestion level, and the criterion is not satisfied when the determined level of congestion is greater than the acceptable congestion level. In one example, the metric may be a measure of safety. In this case, the criterion may be an acceptable safety measure, and the criterion is not satisfied when the measure of safety is less than the acceptable safety measure.

At 206, the first wireless device 102 implements a second mechanism to estimate a range between the first wireless device and the one or more second wireless devices when the metric fails to satisfy a criterion. The second range-estimation mechanism may be based on unicast messages transmitted over a second communication channel (e.g., secondary communication channel 134). The second communication channel may be associated with a second RAT that supports communication over the second communication channel. The second communication channel may be one of a DSRC channel, a LTE channel, and a WiFi channel.

As part of implementing the second mechanism, the first wireless device 102 may send a control signal over the first communication channel. For example, the control signal may be included in a message 116 and may include a flag (e.g., trigger control signal 110) that indicates a switch from the first mechanism to the second mechanism. The message (e.g., message 116) carrying the control signal may be a broadcast message. The control signal may also include an identification of the one or more second wireless devices, an identification of the second communication channel, and timing information for the second mechanism. The identification of the one or more second wireless devices and the identification of the second communication channel may cause the one or more second wireless devices to active for unicast communication over the secondary communication channel by, for example, turning on a radio that supports the secondary communication channel 134. The radio may be, for example, a LTE radio, a Wi-Fi radio, or a radio that supports DSRC.

At 208, upon implementing the second mechanism, the first wireless device 102 initiates a unicast ranging message exchange with the one or more second wireless devices. As part of the message exchange, the first wireless device 102 sends a unicast ranging request message (e.g., FTM packet 118) to the one or more second wireless devices 104. The second wireless device 104 may respond by sending a unicast ranging response message (e.g., ACK packet 120) to the first wireless device, in which case the first wireless device 102 receives a ranging response. Based on these message exchanges, the first wireless device 102 determines the range between itself and the one or more second wireless devices 104.

In the case of a plurality of second wireless devices 104, the first wireless device 102 may select a subset of the plurality of second wireless devices for which to implement the second mechanism. The selection may be based on a comparison of relative metrics for the plurality of second wireless devices. For example, if there are ten second wireless devices, those five devices having the poorest accuracy of the first range-estimation mechanism may be selected to switch to the second mechanism.

Figure 3:
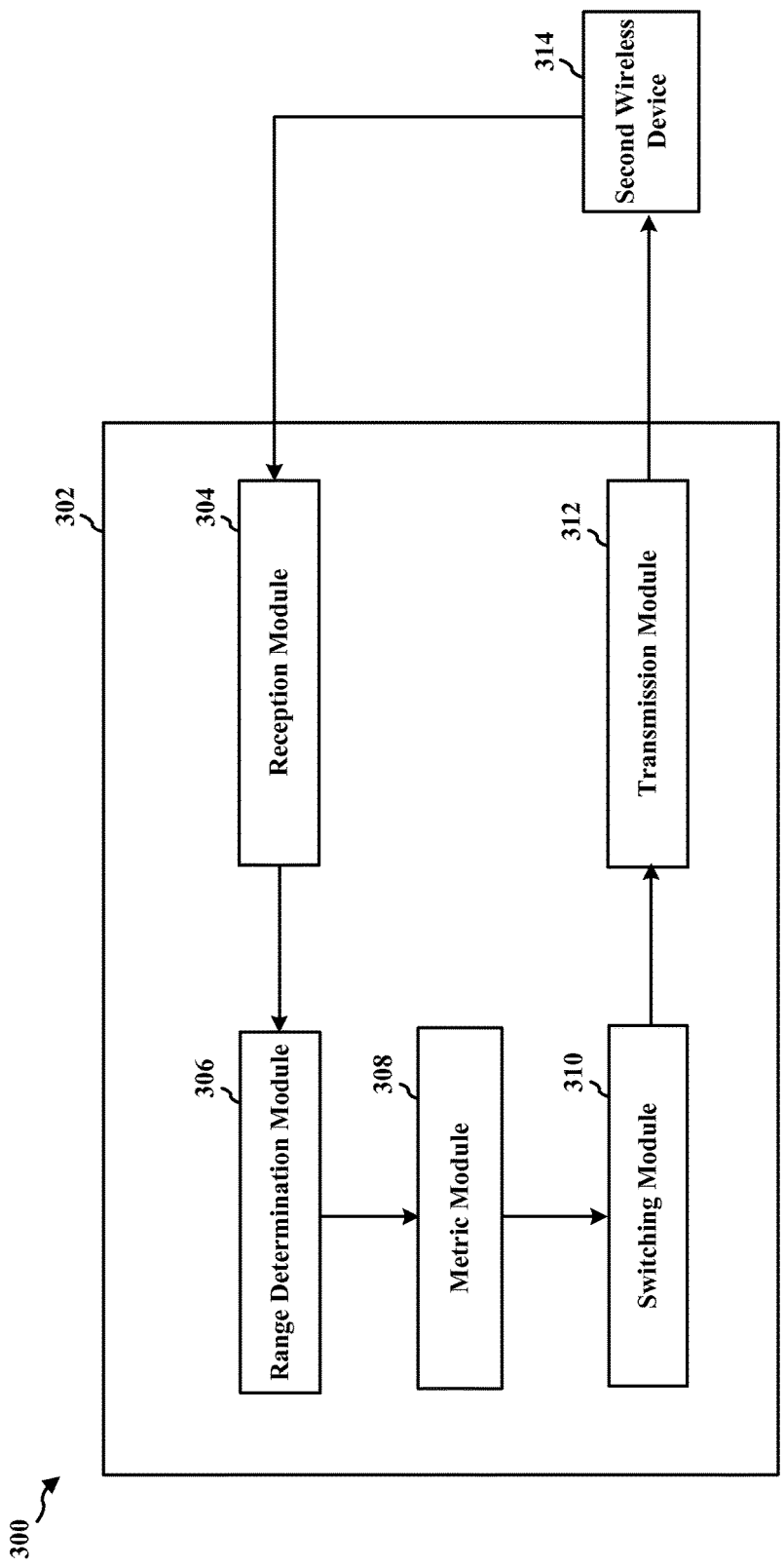
FIG. 3 is a conceptual data flow diagram illustrating the data flow between different modules/means/components in an exemplary apparatus that implements the method of FIG. 2.

FIG. 3 is a conceptual data flow diagram illustrating the data flow between different modules/means/components in an exemplary apparatus that implements the method of FIG. 2. The apparatus 302 may be a first wireless device (e.g., first wireless device 102) configured to estimate a range between itself and one or more second wireless devices 314. The apparatus 302 includes a reception module 304, range determination module 306, a metric module 308, a switching module 310, and a transmission module 312.

The reception module 304 receives messages from the one or more second wireless devices 314. The transmission module 312 transmits messages from the apparatus 302. The messages may be broadcast message or unicast messages. For example, referring to FIG. 1, the messages may include messages (e.g. packets) 112, 116, 118, and/or 119.

The range determination module 306 estimates a range between the first wireless device and the one or more second wireless devices using a first mechanism based on messages transmitted over a first communication channel. The messages may be broadcast messages. Examples of the operations of the range determination module 306 are described in further detail in association with FIGS. 5-8. The metric module 308 obtains a metric indicative of an accuracy of the first mechanism. For example, referring to FIG. 2 (e.g., the description associated with 204), the metric may be an estimate of a ranging accuracy, packet loss probability, a level of congestion in the communications network supporting the first communication channel, and/or a measure of safety.

The switching module 310 implements a second mechanism to estimate a range between the first wireless device and the one or more second wireless devices when the metric fails to satisfy a criterion. The second mechanism may be based on unicast messages transmitted over a second communication channel (e.g., secondary communication channel 134). For example, referring to FIG. 1, the second mechanism may be RTT ranging via the messages (e.g., packets) 118, 119, and 120 over the secondary communication channel 134.

Figure 4:
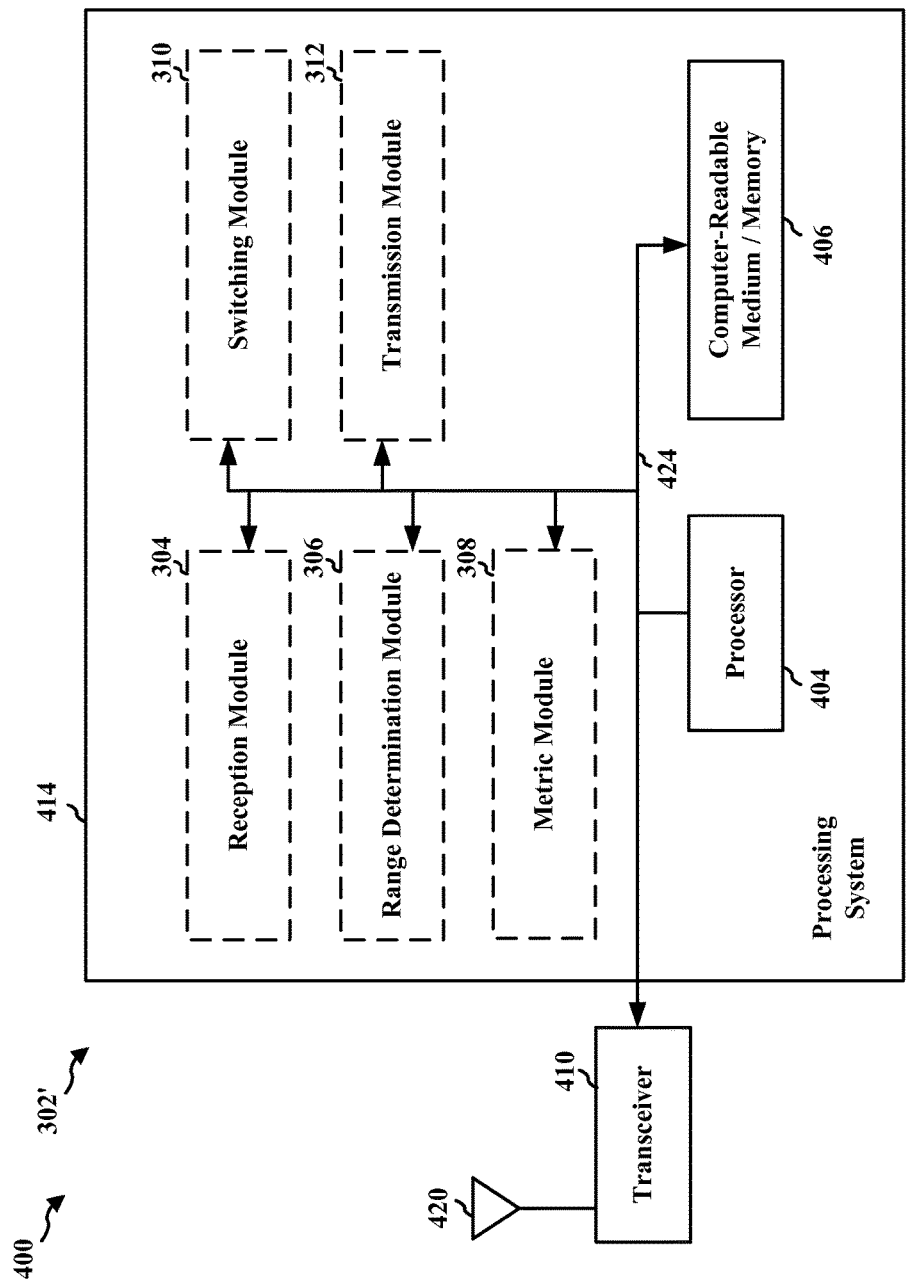
FIG. 4 is a diagram illustrating an example of a hardware implementation for an apparatus employing a processing system that implements the method of FIG. 2.

FIG. 4 is a diagram illustrating an example of a hardware implementation for an apparatus employing a processing system that implements the method of FIG. 2. The processing system 414 may be implemented with a bus architecture, represented generally by the bus 424. The bus 424 may include any number of interconnecting buses and bridges depending on the specific application of the processing system 414 and the overall design constraints. The bus 424 links together various circuits including one or more processors and/or hardware modules, represented by the processor 404, the modules 304, 306, 308, 310, 312 and the computer-readable medium/memory 406. The bus 424 may also link various other circuits such as timing sources, peripherals, voltage regulators, and power management circuits, which are well known in the art, and therefore, will not be described any further.

The processing system 414 may be coupled to a transceiver 410. The transceiver 410 is coupled to one or more antennas 420. The transceiver 410 provides a means for communicating with various other apparatus over a transmission medium. The transceiver 410 receives a signal from the one or more antennas 420, extracts information from the received signal, and provides the extracted information to the processing system 414, specifically the reception module 304. In addition, the transceiver 410 receives information from the processing system 414, specifically the transmission module 312, and based on the received information, generates a signal to be applied to the one or more antennas 420.

The processing system 414 includes a processor 404 coupled to a computer-readable medium/memory 406. The processor 404 is responsible for general processing, including the execution of software stored on the computer-readable medium/memory 406. The software, when executed by the processor 404, causes the processing system 414 to perform the various functions described supra for any particular apparatus. The computer-readable medium/memory 406 may also be used for storing data that is manipulated by the processor 404 when executing software. The processing system further includes at least one of the modules 304, 306, 308, 310, and 312. The modules may be software modules running in the processor 404, resident/stored in the computer readable medium/memory 406, one or more hardware modules coupled to the processor 404, or some combination thereof.

In one configuration, the apparatus 302/302' for wireless communication includes means for estimating a range between a first wireless device and one or more second wireless devices using a first mechanism based on messages transmitted over a first communication channel, and means for obtaining a metric indicative of an accuracy of the first mechanism. The apparatus 302/302' for wireless communication further includes means for implementing a second mechanism to estimate a range between the first wireless device and the one or more second wireless device when the metric fails to satisfy a criterion, where the second mechanism is based on unicast messages transmitted over a second communication channel. The apparatus 302/302' for wireless communication also includes means for sending a unicast ranging request message to the one or more second wireless device upon implementing to the second mechanism.

The aforementioned means may be one or more of the aforementioned modules of the apparatus 302 and/or the processing system 414 of the apparatus 302' configured to perform the functions recited by the aforementioned means. For example, the means for estimating a range between a first wireless device and one or more second wireless devices may correspond to the range determination module 306. The means for obtaining a metric may correspond to the metric module 308. The means for implementing a second mechanism to estimate a range may correspond to the switching module 310. The means for sending a unicast ranging request message may correspond to the transmission module 312.

Figure 5:
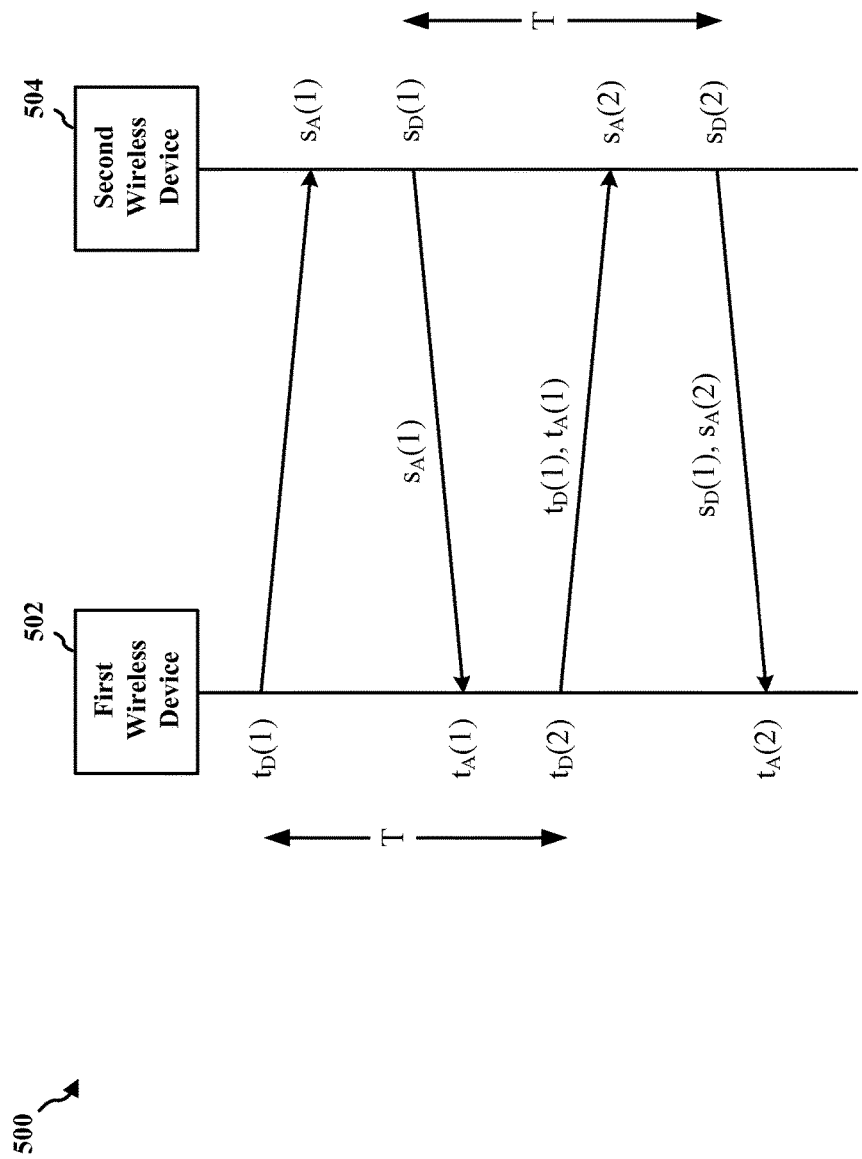
FIG. 5 is an illustration of broadcast message exchange between two wireless devices that provides information for estimating the distance or range between the two devices.

FIG. 5 is an illustration 500 of broadcast message exchange between two wireless devices 502, 504 that provides information for estimating the distance or range between the two devices. The message exchange of FIG. 5 may correspond to the first mechanism or process for estimating a range using a first communication channel, as shown in FIGS. 1 and 2. In one implementation, the message exchange of FIG. 5 may be suitable for operating within the DSRC environment. The DSRC provides periodic broadcasting of safety messages by every vehicle, and the wireless devices 502 and 504 may be within the vehicles. In one example, the messages of the message exchange of FIG. 5 may be added to the packets within the DSRC messages. In this fashion, the number of messages broadcast scales linearly with the number of vehicles.

Accordingly, in some embodiments, the message exchange of FIG. 5 includes periodic broadcast in accordance with, for example, DSRC messages. Referring to FIG. 5, the wireless devices 502 and 504 broadcast the messages in periods of T seconds. In some example, the period T corresponds to the period of the DSRC safety message of 0.1 second.

With continued reference to FIG. 5, the first wireless device 502 may compute a range to the second wireless device 504 from the following timing information (which may be added to the DSRC messages):

1. Timestamps associated with the first wireless device 502 broadcast messages, including for example:
    a. Departure times of messages broadcasted by the first wireless device 502 ($t_D(n)$), as recorded by the first wireless device 502.
    b. Arrival times of messages broadcasted by the first wireless device 502 and received by the second wireless device 504 ($s_A(n)$), which are obtained by the first wireless device 502 from messages subsequently broadcasted by the second wireless device 504.
2. Timestamps associated with the second wireless device 504 broadcast messages, including for example:
    a. Departure times of messages broadcast by the second wireless device 504 ($s_D(n)$), as recorded by the second wireless device 504, which are obtained by the first wireless device 502 from messages subsequently broadcasted by the second wireless device 504.
    b. Arrival times of messages broadcast by the second wireless device 504 and received by the first wireless device 502 ($t_A(n)$), as determined by the first wireless device 502.

While range is computed, the first wireless device 502 may account for relative clock drift between the clock of the first wireless device 502 and the clock of the second wireless device 504, and the mobility, if any, of the devices. In some embodiments, a local time "t" may correspond to the local time of the first wireless device 502, and the remote time "s" may correspond to the local time of the second wireless device 504. The local times satisfy the following linear relationship:

$$s(t)=\phi+(1+\delta)t,$$

where $\phi$ is the clock offset, and $\delta$ is the clock drift. An example of the clock drift $\delta$ is $\pm 10^{-5}$, which may be expressed as 10 part per million (ppm).

In one example, the delay between a message departure and the following message arrival is on the order of T/2. Hence, the clock drift during this period is on the order of $\delta T/2$. For example, in DSRC, T=0.1 s, and the drift of a 10 ppm clock during that time is on the order of 0.5 ms. In this example, the clock drift of 0.5 ms would result in a ranging error of approximately 150 m. For ranging accuracy on the order of 0.3 m, the uncompensated clock drift $\delta$ may at most be 0.01 ppm between successive samples. In the example, the clock drift $\delta$ may be modeled as a constant within a window "w" of a few seconds (corresponding to a few tens of DSRC message exchanges).

The arrival and departure timestamps may be described as follows:

$$s_A(n)=\phi+(1+\delta)t_D(n)+d_D(n)/c+z_A(n),$$

$$s_D(n)=\phi+(1+\delta)t_A(n)-d_A(n)/c+z_D(n),$$

where $d_D(n)$ and $d_A(n)$ are the distances between the wireless devices 502 and 504 (e.g., inter-vehicle distances) at times $t_D(n)$ and $t_A(n)$, c is the speed of light, and $z_A(n)$ and $z_D(n)$ are additive receiver noise terms. In some examples, the $z_A(n)$ and $z_D(n)$ are independent and identically distributed random variables (e.g., i.i.d.) with mean zero and $\sigma^2$. The above relationships of $s_A(n)$ and $s_D(n)$ link the departure and arrival timestamps to the distances between the wireless devices 502 and 504 (e.g., inter-vehicle distances). Because of the movement of the vehicles, these distances may be time-varying (e.g., change as a function of n). Since the vehicle distances may change by several tens of meters per second, this time-varying nature of the distances may be taken into account when using periodic packet broadcasts for ranging. For example, in DSRC with T=0.1 s, the change in distances may be on the order of several meters between successive message arrivals.

As described above, at the arrival time $t_A(n)$ of the message n at the first wireless device 502 (e.g., local vehicle), the device or vehicle has access to all locally measured timestamps $t_D(i)$ and $t_D(i)$ with i≤n. From the received messages, the first wireless device 502 (e.g., local vehicle) has also access to the remotely measured timestamps $s_A(i)$ with i≤n and $s_D(i)$ with i<n. The $s_D(n)$ may not available at the first wireless device 502 or local vehicle at time $t_A(n)$ due to hardware limitations. The periodic ranging may estimate the distance $d_A(n)$ at the $t_A(n)$, as described below.

The local time t and the remote time s are related through clock offset $\phi$ and a clock drift $\delta$. The timestamp differences may be defined as follows:

$$\Delta t_D(n)=t_D(n)-t_D(n-1),$$

$$\Delta s_A(n)=s_A(n)-s_A(n-1),$$

$$\Delta t_A(n)=t_D(n)-t_A(n-1),$$

$$\Delta s_D(n)=s_A(n)-s_D(n-1).$$

The above quantities are defined such that, for index n, they are all available at the local vehicle at time $t_A(n)$. Moreover, the above timestamp relationships may be written as follows:

$$\Delta s_A(n)=(1+\delta)\Delta t_D(n)+(d_D(n)-d_D(n-1))/c+\Delta z_A(n),$$

$$\Delta s_D(n)=(1+\delta)\Delta t_A(n)+(d_D(n)-d_A(n-1))/c+\Delta z_D(n),$$

with the following definitions:

$$\Delta z_A(n)=z_A(n)-z_A(n-1),$$

$$\Delta z_D(n)=z_A(n)-z_D(n-1).$$

Thus, the transformed measurements are invariant with respect to the clock offset $\phi$.

Both relative clock drift $\delta$ and mobility change slowly over time, and hence, low-order models may be utilized. Low-order models reduce the number of unknown parameters and hence make range estimation feasible. Some specific examples for low-order models include: 1) Relative clock drift could be approximated by a linear model, and 2) Range between two devices could be approximated by a quadratic model. The parameters associated with the above models or other low-order models need to be re-estimated based on the time-scales involved. The algorithm for joint estimation of these parameters may include weighted local polynomial regression:

For example, at time $t_A(n)$, the following equations may be used to jointly solve for clock drift $\delta$ and distance $d_A(n)$:
Minimize:

$(c\Delta s_A(n)-(1+\delta)c\Delta t_D(n)-a_1 t_D(n)-a_2 t_D^2(n)+a_1 t_D(n-1)+ a2tD2n-12$ $+(c\Delta s_D(n)-(1+\delta)c\Delta t_A(n)-2a_0-a_1 t_D(n)-a_2 t_D^2(n)- a1tAn-1-a2tA2(n-1)2$ $+ \ldots +(c\Delta s_A(n-w)- \ldots )^2+(c\Delta s_D(n-w)- \ldots )^2$ where w is the window length.
Can be written in matrix form: Minimize $\|\beta - Bx\|^2$ $\beta = c[\Delta s_A(n-w:n)-\Delta t_D(n-w:n);\Delta s_D(n-w:n)-\Delta t_A(n-w:n)]$ $B=[\Delta t_D(n-w:n),0,t_D(n-w:n)-t_D(n-w-1:n-1),t_D^2(n-w:n-tD2n-w-1:n-1;$ $\Delta t_A(n-w:n),2,t_D(n-w:n)+t_A(n-w-1:n-1),t_D^2(n-w:n)+t_A^2(n-w-1:n-1)]$ $x=[c\delta;a_0;a_1;a_2]$ Closed-form solution $\hat{x}=(B^T B)^{-1} B^T \beta$ From this, the distance estimate is $\hat{d}_A(n)=a_0+a_1 t_A(n)+a_2 t_A^2(n)$ Reasonable to give less weight to old measurements
   Normalize time offset by window size
     Let W be diagonal weight matrix, example, use tricube weight function
     Weighted least-squares solution $\hat{x}=(B^T WB)^{-1} B^T W\beta$ In some examples, the window size w may be at least two for the matrix $B^T B$ to be invertible. Larger values of w may result in larger noise suppression. On the other hand, too large a value of w may lead to biased estimates. In the DSRC setting, w=8 may be a reasonable value. Alternatively, the window size w may be selected adaptively.

In an alternate method, all devices calculate departure time and arrival timestamps with respect to a reference clock. For example, this reference clock could be associated with a selected cluster head. Note that only clock drift correction is required for the above method. Time offset correction is difficult to achieve to the accuracy required and is not required in the method described.

An exemplary of a method to compress the measured timestamps to reduce the overhead of communicating is provided below. The compression of the timestamps may include discarding the most significant bits. Since each wireless device (e.g., vehicle including the wireless device) gets periodic ranging estimates, an approximate distance estimate at the current time is known, which correspond to the higher-order bits. Accordingly, only the lower-order bits may be used to enhance the estimation accuracy.

For example, denote $[\Delta s_A(n)]$ as the compressed timestamp corresponding to $\Delta s_A(n)$. Then the $[\Delta s_A(n)]$ may be defined as:

$[\Delta s_A(n)]=10^9 \Delta s_A(n) \bmod 2^L,$ for a fixed positive integer L. Assuming that $\Delta s_A(n)$ is measured in integer nanoseconds, then the quantity $[\Delta s_A(n)]$ may be encoded using L bits. These L bits may then be transmitted from the second wireless device 504 to the first wireless device 502.

To recover $\Delta s_A(n)$ from $[\Delta s_A(n)]$, the following relationship may be utilized:

$10^9 \times \Delta s_A(n)=[\Delta s_A(n)]+k_A 2^L$ for an integer $k_A$. The integer $k_A$ may be estimated as follows:

$$\hat{k}_A(n) = \left\lfloor \left(10^9 \frac{\Delta t_D(n)}{\Delta t_D(n-1)} \Delta S_A(n-1) - [\Delta S_A(n)]/2^L \right)\right\rceil,$$

where the operator $\lfloor . \rceil$ rounds to the closest integer. If the number of bits L is larger than $\log(2 \times 10^9 \rho \times \Delta t_D(n))$, then $\hat{k}_A(n)$ may equal to $k_A(n)$. Accordingly, $\Delta s_A(n)$ may be recovered from the compressed value $[\Delta_A(n)]$.

In the DSRC example, L>7.7 provides that 8 bits are sufficient to transmit $[\Delta s_A(n)]$. In some examples, the IEEE 802.11mc defines a Fine-Timing-Measurement (FTM) protocol of 6 bytes for RTT ranging in the WiFi signal spectrum. Thus, instead of transmitting 6 bytes as in the FTM standard, only need 1 byte may be used with the above compression method. In some examples, L of 12 bits may be used to handle situations with dropped or non-line-of-sight measurements.

To initiate the recovery of $\Delta s_A(n)$ from $[\Delta s_A(n)]$, the initial measurement $s_A(1)$ may be transmitted uncompressed. Alternatively, $[\Delta s_A(1)]$ and $[\Delta s_A(2)]$ may be decompressed jointly by solving a Diophantine approximation problem. In some implementations, the compression and decompression of timestamps such as $\Delta s_D(n)$, $\Delta t_A(n)$, $\Delta t_D(n)$ may be performed analogously. In some embodiments, the ranging request packets as described above, may be transmitted in the 5.2 GHz Wi-Fi band at a bandwidth of 80 MHz.

Figure 6:
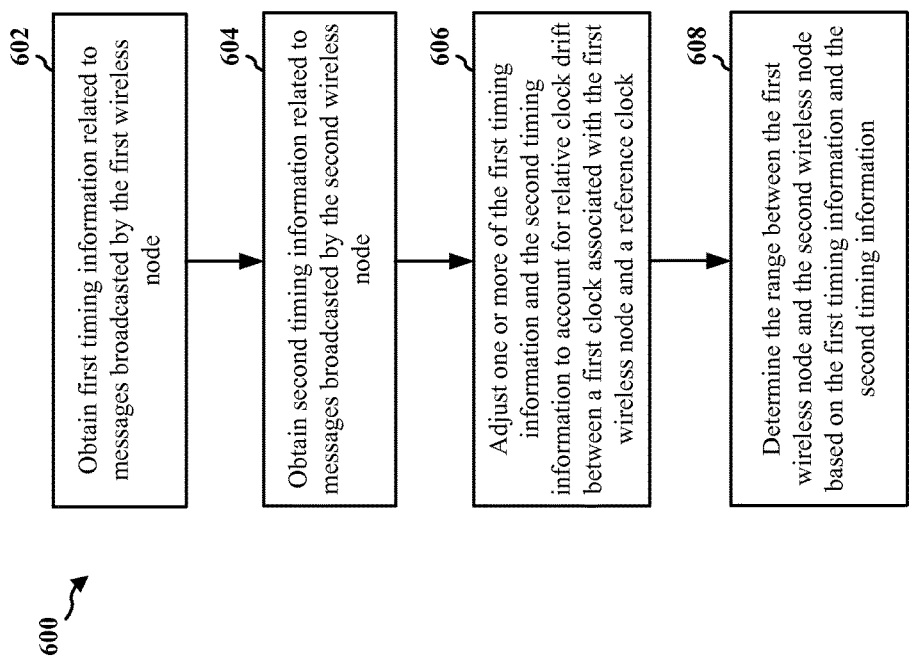
FIG. 6 is a flow chart of a method of estimating a range between a first wireless device and a second wireless device.

FIG. 6 is a flow chart of a method 600 of estimating a range between a first wireless device 502 and a second wireless device 504. The method may be performed by the first wireless device 502. In some implementations, the range determination module 306 may perform the method 600 as the operation 202 of the flow chart 200.

At 602, first timing information of messages broadcasted by the first wireless device 502 is obtained. The first timing information may include, for each message broadcasted by the first wireless device, a time of departure of the message from the first wireless device ($t_D$). The time of departure $t_D$ may be recorded by the first wireless device 502. The first timing information may also include, for each message broadcasted by the first wireless device 502, a time of arrival of the message at the second wireless device ($s_A$). The time of arrival $s_A$ may be determined by the second wireless device 504 at receipt of the message and subsequently included in a message broadcasted by the second wireless device 504. The first timing information may further include identification information for the first wireless device.

The first timing information received by the first wireless device 502 in a broadcast message may be compressed. For example, the timestamps in the broadcast messages may be compressed by the wireless device that transmits the message by, for example, transmitting only the least significant bits of the timing information. On the receiving end, the first wireless device 502 may reconstruct the most significant bits of the timing information based on prior coarse positional information. The compression scheme may include, for example, recovering $\Delta S_A(n)$ from the L bits compressed timestamps $[\Delta s_A(n)]$ as described with FIG. 5.

At 604, second timing information of messages broadcasted by the second wireless device 504 is obtained. The second timing information may include, for each message broadcasted by the second wireless device 504, a time of departure of the message from the second wireless device ($s_D$). The time of departure $s_D$ may be recorded by the second wireless device 504 and included in a message broadcasted by the second wireless device 504. The second timing information may also include, for each message broadcasted by the second wireless device 504, a time of arrival of the message at the first wireless device ($t_A$). The time of arrival $t_A$ may be determined by the first wireless device 502 at receipt of the message, and subsequently included in a message broadcasted by the second wireless device 504. The second timing information may further include identification information for the second wireless device 504.

The second timing information received by the first wireless device 502 in a broadcast message may be compressed. For example, the timestamps in the broadcast messages may be compressed by the wireless device that transmits the message by, for example, transmitting only the least significant bits of the timing information. On the receiving end, the first wireless device 502 may reconstruct the most significant bits of the timing information based on prior coarse positional information.

At 606, one or both of the first timing information and the second timing information may be adjusted to account for relative clock drift between a first clock associated with the first wireless device 502 and a reference clock. The reference clock may be a second clock associated with the second wireless device 504. The reference clock may be selected based on a signaling exchange between the first wireless device 502 and the second wireless device 504. The adjustment based on the relative clock drift may be as described with FIG. 5.

At 608, the range between the first wireless device 502 and the second wireless device 504 based on the first timing information and the second timing information is determined. The clock drift and range may be determined using: low-order model for clock drift, e.g., linear model; low-order model for range, e.g., quadratic model; jointly compute clock drift and range, e.g., weighted local linear regression, such as shown in the equations described in association with FIG. 5.

Figure 7:
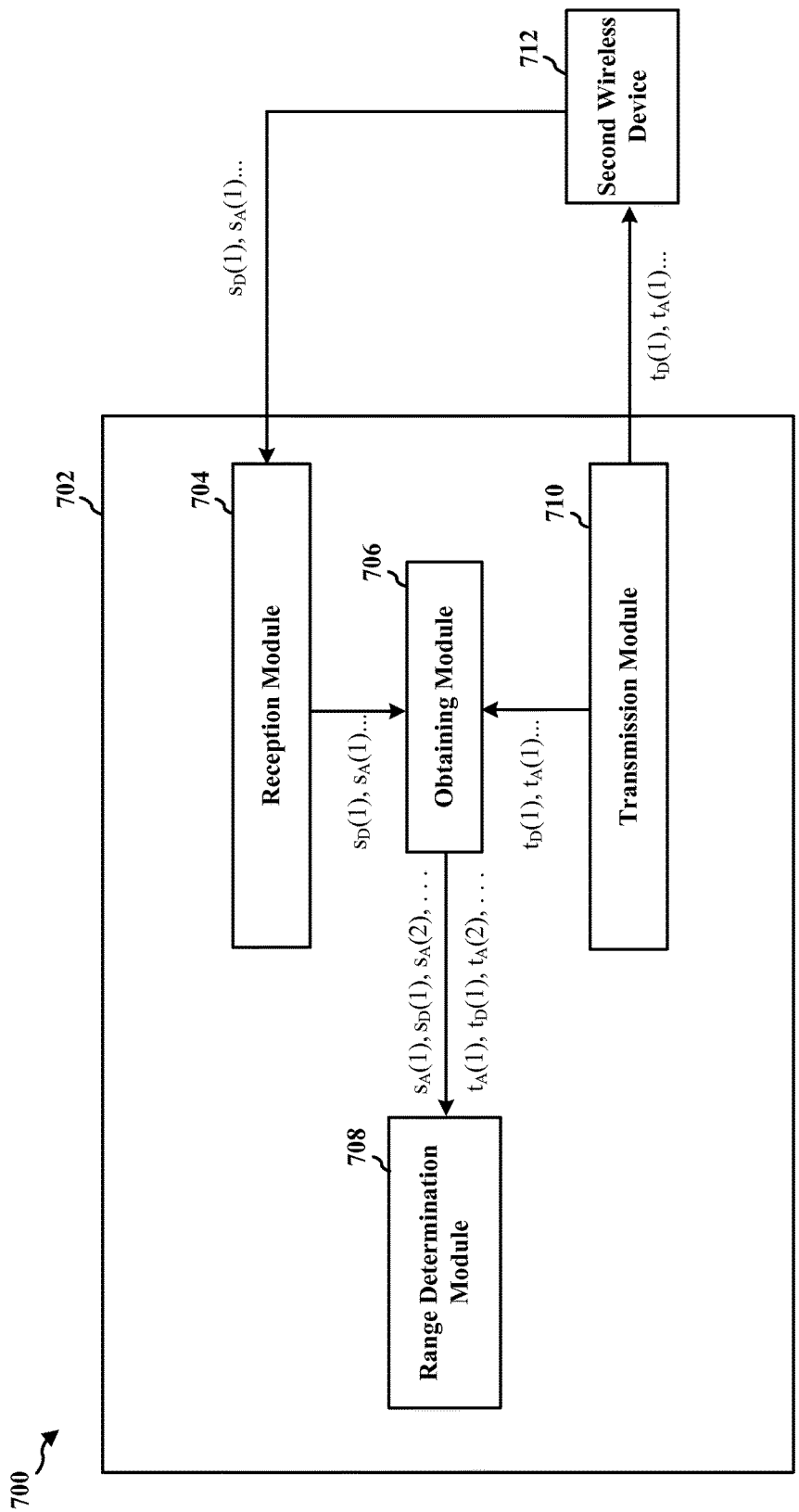
FIG. 7 is a conceptual data flow diagram illustrating the data flow between different modules/means/components in an exemplary apparatus that implements the method of FIG. 6.

FIG. 7 is a conceptual data flow diagram 700 illustrating the data flow between different modules/means/components in an exemplary apparatus 702. The apparatus 702 may be a first wireless device configured to estimate a range between itself and a second wireless device 712. In some examples, the apparatus 702 may correspond to the first wireless device 502, and the second wireless device 712 may correspond to the second wireless device 504. The apparatus 702 may perform the operations described in FIGS. 5 and 6, as provided below. The apparatus 702 includes a reception module 704, an obtaining module 706, a range determination module 708, and a transmission module 710.

The reception module 704 receives messages broadcasted by the second wireless device 712 (e.g., second wireless device 504). The transmission module 710 transmits broadcast messages from the first wireless device (e.g., first wireless device 502). In one example, the reception module 704 receives messages transmitted by the second wireless device 504, such as $s_A(n)$ and $s_D(n)$ (as described with FIG. 5), and the transmission module 710 transmits broadcast messages to the second wireless device 504, such as $t_A(n)$ and $t_D(n)$ (as described with FIG. 5).

The obtaining module 706 obtains first timing information related to messages broadcasted by the first wireless device and second timing information related to messages broadcasted by the second wireless device 712 (e.g., operations 602 and 604 described above). The information may be obtained from messages received by the reception module 704. For example, the messages may include timestamps or packets that include the information. The information may also be obtained locally based on the broadcasting of messages by the transmission module 710, or the receiving of messages by the reception module 704. For example, the obtaining module 706 may record the time of departure of messages transmitted by the transmission module 710 or the time of arrival of messages received by the reception module 704.

The range determination module 708 determines the range between the apparatus 702 and the second wireless device 712 based on the first timing information and the second timing information (e.g., operations 606 and 608 described above). For example, the range may be determined using: low-order model for clock drift, e.g., linear model; low-order model for range, e.g., quadratic model; jointly compute clock drift and range, e.g., weighted local linear regression, such as shown in the equations described in association with FIG. 5. In some examples, the range determination module 708 may adjust the one or more of the first timing information and the second timing information to account for relative clock drift (e.g., operation 606).

The apparatus 702 may include additional modules that perform each of the blocks of the algorithm in the aforementioned flow chart of FIG. 6. As such, each block in the aforementioned flow charts of FIG. 6 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 8:
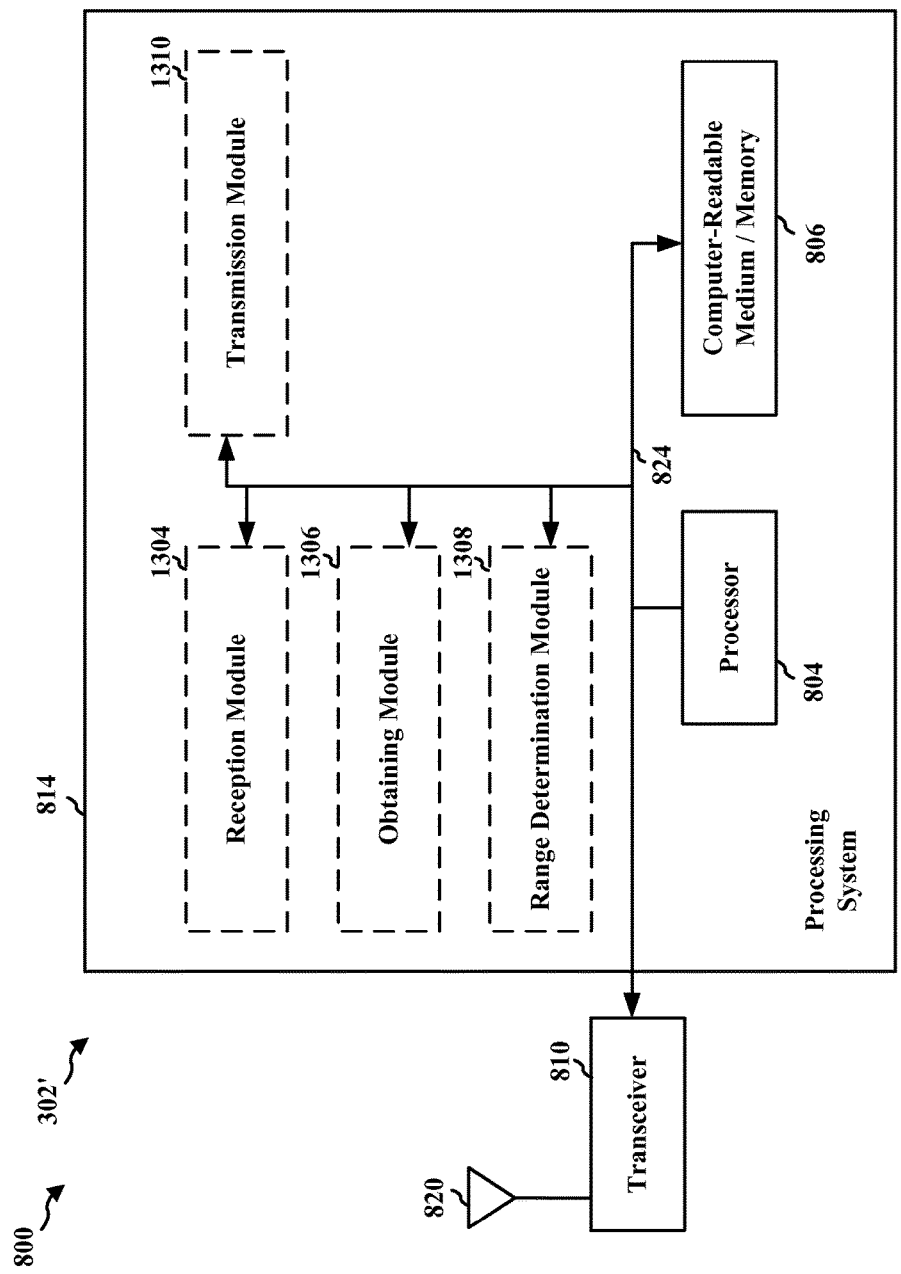
FIG. 8 is a diagram illustrating an example of a hardware implementation for an apparatus employing a processing system that implements the method of FIG. 6.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware modules, represented by the processor 804, the modules 704, 706, 708, 710 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception module 704. In addition, the transceiver 810 receives information from the processing system 814, specifically the transmission module 710, and based on the received information, generates a signal to be applied to the one or more antennas 820.

The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system further includes at least one of the modules 704, 706, 708, and 710. The modules may be software modules running in the processor 804, resident/stored in the computer readable medium/memory 806, one or more hardware modules coupled to the processor 804, or some combination thereof.

In one configuration, the apparatus 702/702' for wireless communication includes means for obtaining first timing information related to messages broadcasted by the first wireless device, and means for obtaining second timing information related to messages broadcasted by the second wireless device. The apparatus 702/702' for wireless communication further includes means for determining the range between the first wireless device and the second wireless device based on the first timing information and the second timing information.

The aforementioned means may be one or more of the aforementioned modules of the apparatus 702 and/or the processing system 814 of the apparatus 702' configured to perform the functions recited by the aforementioned means. For example, the means for obtaining first timing information may correspond to the obtaining module 706 together with one or both of the reception module 704 and transmission module 710 which provide messages that include first timing information. Likewise, the means for obtaining second timing information may correspond to the obtaining module 706 together with one or both of the reception module 704 and transmission module 710 which provide messages that include second timing information. The means for determining the range may correspond to the range determination module 708.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of range estimation by a first wireless device relative to one or more second wireless devices, comprising:
   estimating a range between the first wireless device and the one or more second wireless devices using a dedicated short-range communications (DSRC) mechanism based on timestamps associated with broadcast messages exchanged between the first wireless device and the one or more second wireless devices over a first communication channel;
   determining an accuracy metric of the range estimated by the dedicated short-range communications (DSRC) mechanism; and
   switching to a second mechanism to estimate a range between the first wireless device and the one or more second wireless devices over a second communication channel if the accuracy metric fails to meet a threshold, wherein the switching comprises providing a control signal for transmission over the first communication channel, the control signal indicating that the estimation is to switch to the second mechanism that uses round trip time (RTT) ranging,
   wherein the accuracy metric is based on packet loss, the threshold is associated with a maximum packet loss value, and the threshold is not met if the packet loss is greater than the maximum packet loss value.

2. The method of claim 1, wherein the first communication channel comprises a DSRC channel, and the second communication channel comprises one of a DSRC channel, a cellular network channel, and a wireless LAN channel.

3. The method of claim 1, wherein the accuracy metric comprises an estimation error, the threshold comprises a maximum level of error, and the threshold is not met if the estimation error is greater than the maximum level of error.

4. The method of claim 1, wherein the accuracy metric comprises a packet loss probability, the threshold comprises a maximum probability value, and the threshold is not met if the packet loss probability is greater than the maximum probability value.

5. The method of claim 1, wherein the accuracy metric comprises a level of congestion in a communications network supporting the first communication channel, the threshold comprises a maximum congestion level, and the threshold is not met if the determined level of congestion is greater than the maximum congestion level.

6. The method of claim 1, wherein the accuracy metric comprises a measure of safety, the threshold comprises a minimum safety threshold, and the threshold is not met if the measure of safety is less than the minimum safety threshold.

7. The method of claim 1, wherein the control signal includes an identification of the one or more second wireless devices, an identification of the second communication channel, and timing information for the second mechanism.

8. The method of claim 7, further comprising, in a case of a plurality of second wireless devices, selecting a subset of the plurality of second wireless devices for which to switch to the second mechanism based on a comparison of the accuracy metric and the threshold.

9. The method of claim 7, wherein the identification of the one or more second wireless devices, and the identification of the second communication channel cause the one or more second wireless devices to be active for unicast communication over the second communication channel.

10. The method of claim 1, further comprising, after switching to the second mechanism, providing a unicast ranging request message for transmission to the one or more second wireless devices.

11. An apparatus for range estimation by a first wireless device relative to one or more second wireless devices, said apparatus comprising:
means for estimating a range between the first wireless device and each of the one or more second wireless devices using a dedicated short-range communications (DSRC) mechanism based on timestamps associated with broadcast messages exchanged between the first wireless device and the one or more second wireless devices over a first communication channel;
means for determining an accuracy metric of the range estimate by the dedicated short-range communications (DSRC) mechanism; and
means for switching to a second mechanism to estimate a range between the first wireless device and the one or more second wireless devices over a second communication channel if the accuracy metric fails to meet a threshold, wherein the means for switching to the second mechanism is configured to provide a control signal for transmission over the first communication channel, the control signal indicating that the estimation is to switch to the second mechanism that uses round trip time (RTT) ranging,
wherein the accuracy metric is based on packet loss, the threshold is associated with a maximum packet loss value, and the threshold is not met if the packet loss is greater than the maximum packet loss value.

12. The apparatus of claim 11, wherein the first communication channel comprises a (DSRC) channel and the second communication channel comprises one of a DSRC channel, a cellular network channel, and a wireless LAN channel.

13. The apparatus of claim 11, wherein the control signal includes an identification of the one or more second wireless devices, an identification of the second communication channel, and timing information for the second mechanism.

14. The apparatus of claim 13, further comprising means for selecting, in a case of a plurality of second wireless devices, a subset of the plurality of second wireless devices for which to switch to the second mechanism based on a comparison of the accuracy metric and the threshold.

15. The apparatus of claim 13, wherein the identification of the one or more second wireless devices, and the identification of the second communication channel cause the one or more second wireless devices to be active for unicast communication over the second communication channel.

16. An apparatus for range estimation, said apparatus comprising: a memory; and
at least one processor coupled to the memory and configured to:
estimate a range between the apparatus and one or more second wireless devices using a dedicated short-range communications (DSRC) mechanism based on timestamps associated with broadcast messages exchanged between the apparatus and the one or more second wireless devices over a first communication channel;
determine an accuracy metric of the range estimated by the dedicated short-range communications (DSRC) mechanism; and switch to a second mechanism to estimate a range between the apparatus and the one or more second wireless devices over a second communication channel if the accuracy metric fails to meet a threshold, wherein the at least one processor is configured to switch to the second mechanism by providing a control signal for transmission over the first communication channel, the control signal indicating that the estimation is to switch to the second mechanism that uses round trip time (RTT) ranging,
wherein the accuracy metric is based on packet loss, the threshold is associated with a maximum packet loss value, and the threshold is not met if the packet loss is greater than the maximum packet loss value.

17. The apparatus of claim 16, wherein the control signal includes an identification of the one or more second wireless devices, an identification of the second communication channel, and timing information for the second mechanism.

18. The apparatus of claim 17, wherein the at least one processor coupled to the memory is further configured to select a subset of the one or more second wireless devices for which to switch to the second mechanism based on a comparison of the accuracy metric and the threshold.

19. The apparatus of claim 17, wherein the identification of the one or more second wireless devices, and the identification of the second communication channel cause the one or more second wireless devices to be active for unicast communication over the second communication channel.

20. The apparatus of claim 16, wherein the at least one processor coupled to the memory is further configured to, after switching to the second mechanism, provide a unicast ranging request message for transmission to the one or more second wireless devices.

21. The method of claim 1, wherein the second mechanism estimates the range based on the RTT ranging via unicast messages exchanged between the first wireless device and a subset of the one or more second wireless devices over the second communication channel.

22. The apparatus of claim 11, wherein the second mechanism estimates the range based on the RTT ranging via unicast messages exchanged between the first wireless device and a subset of the one or more second wireless devices over the second communication channel.

23. The apparatus of claim 16, wherein the second mechanism estimates the range based on the RTT ranging via unicast messages exchanged between the apparatus and a subset of the one or more second wireless devices over the second communication channel.

24. The apparatus of claim 16, wherein the first communication channel comprises one of a dedicated short-range communications (DSRC) channel, a cellular network channel, and a wireless LAN channel, and the second communication channel comprises one of a dedicated short-range communications (DSRC) channel, a cellular network channel, and a wireless LAN channel.

25. The apparatus of claim 16, wherein the accuracy metric comprises an estimation error, the threshold comprises a maximum level of error, and the threshold is not met if the estimation error is greater than the maximum level of error.

26. The apparatus of claim 16, wherein the accuracy metric comprises a packet loss probability, the threshold comprises a maximum probability value, and the threshold is not met if the packet loss probability is greater than the maximum probability value.

27. The apparatus of claim 16, wherein the accuracy metric comprises a level of congestion in a communications network supporting the first communication channel, the threshold comprises a maximum congestion level, and the threshold is not met if the determined level of congestion is greater than the maximum congestion level.

28. The apparatus of claim 16, wherein the accuracy metric comprises a measure of safety, the threshold comprises a minimum safety threshold, and the threshold is not met if the measure of safety is less than the minimum safety threshold.

29. A wireless device for range estimation, comprising:
a processing system configured to:
estimate a range between the wireless device and one or more second wireless devices using a dedicated short-range communications (DSRC) mechanism based on timestamps associated with broadcast messages exchanged between the wireless device and the one or more second wireless devices over a first communication channel;
determine an accuracy metric of the range estimated by the dedicated short-range communications (DSRC) mechanism; and switch to a second mechanism to estimate a range between the wireless device and the one or more second wireless devices over a second communication channel if the accuracy metric fails to meet a threshold; and
a transmitter configured to transmit a control signal over the first communication channel, the control signal indicating that the estimation is to switch to the second mechanism that uses round trip time (RTT) ranging, wherein the accuracy metric is based on packet loss, the threshold is associated with a maximum packet loss value, and the threshold is not met if the packet loss is greater than the maximum packet loss value.

30. The wireless device of claim 29, wherein the second mechanism estimates the range based on the RTT ranging via unicast messages exchanged between the wireless device and the one or more second wireless devices over the second communication channel.

* * * * *